United States Patent
Keen et al.

(10) Patent No.: US 6,457,146 B1
(45) Date of Patent: Sep. 24, 2002

(54) METHOD AND APPARATUS FOR PROCESSING ERRORS IN A COMPUTER SYSTEM

(75) Inventors: John S. Keen, Mountain View; Azmeer Salleh, Santa Clara, both of CA (US)

(73) Assignee: Silicon Graphics, Inc., Mountain View, CA (US)

( * ) Notice: Subject to any disclaimer, the term of this patent is extended or adjusted under 35 U.S.C. 154(b) by 0 days.

(21) Appl. No.: 09/409,764

(22) Filed: Sep. 30, 1999

(51) Int. Cl.[7] .......................... H04B 1/74; G06F 11/00
(52) U.S. Cl. ................................... 714/48; 714/799
(58) Field of Search .............................. 714/799, 718, 714/20, 41, 48

(56) References Cited

U.S. PATENT DOCUMENTS

| | | | |
|---|---|---|---|
| 5,121,342 A | 6/1992 | Szymborski et al. | 364/514 |
| 5,414,713 A | 5/1995 | Waschura et al. | 371/20.4 |
| 5,465,250 A | 11/1995 | Brief | 370/15 |
| 5,654,962 A | * 8/1997 | Rostoker et al. | 370/392 |
| 6,012,148 A | * 1/2000 | Laberge et al. | 714/2 |

OTHER PUBLICATIONS

"Data Switch Error Isolation and Reporting," *IBM Technical Disclosure Bulletin*, XP 000067014, vol. 32, No. 4B, Sep. 1989, pp. 201 and 203.

"Space Switch Network Error–Reporting Reduction Circuit," *IBM Technical Disclosure Bulletin*, XP 000107692, vol. 33, No. 6A, Nov. 1990, pp. 223 and 225.

PCT International Search Report in International Application No. PCT/US 00/25845, dated Jul. 16, 2001, 7 pages.

* cited by examiner

*Primary Examiner*—Christine T. Tu
*Assistant Examiner*—Cynthia Harris
(74) *Attorney, Agent, or Firm*—Baker Botts L.L.P.

(57) ABSTRACT

A node controller (12) includes a local block unit (28) that receives and processes request and reply packets. A request module (30) in the local block unit (28) receives a request packet and determines whether the request packet has an error. If there is no error, the request module (30) forwards local invalidation requests to a invalidation module (32) for processing and forwards programmed input/output read and write requests to a processor module (34) for processing. If an error is detected, the request module (30) forwards the request packet to a registers module (40). The registers module (40) stores the header and data contents of the request packet in header registers (70, 72) and a data register (80). An error bit is corresponding to the identified type of error is set in an error register (50). The request module (40) generates an interrupt signal (52) in response to setting the error bit in the error register (50). The interrupt signal (52) is applied to a processor interface (24) that selects a processor (16) to interrupt and process the error. Errors may also be injected through programmed input/output write operations through the request module (30) and the processor module (34) in order to insert header and data information into the header registers (70, 72) and the data register (80). Software error handling is then triggered by setting a desired error bit in the error register (50).

14 Claims, 3 Drawing Sheets

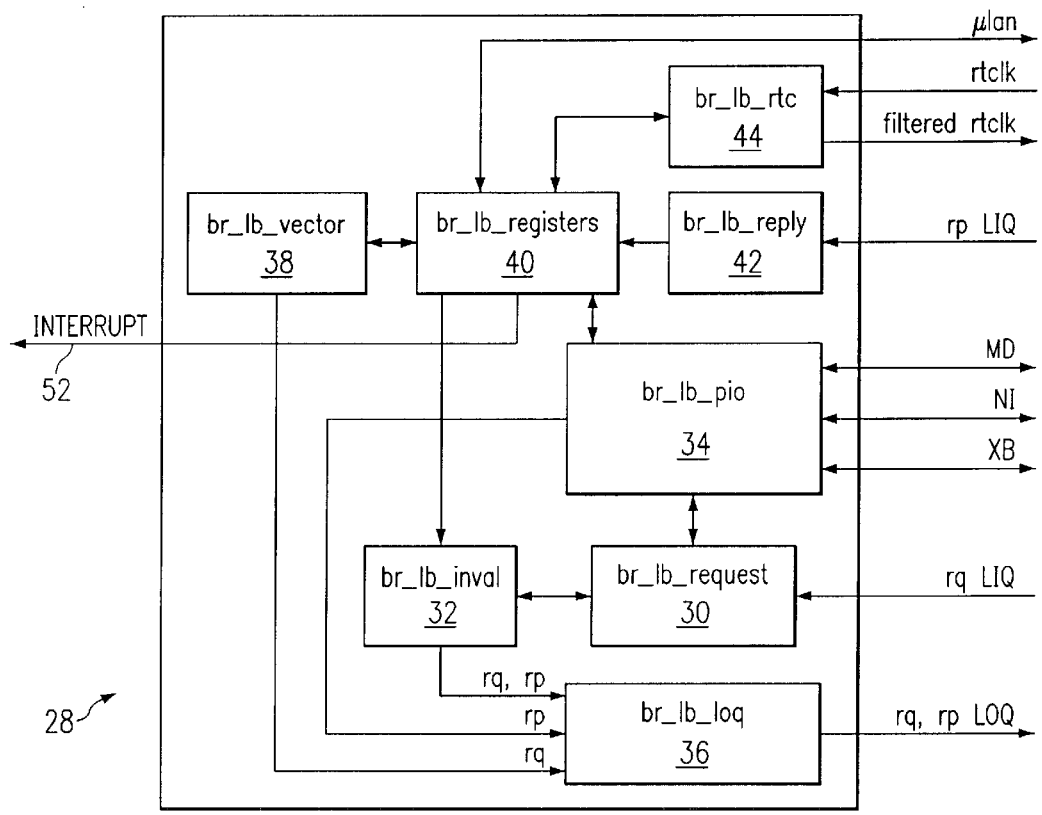

FIG. 3

| BITS | FIELD | ACC. | COMMENT | RESET |
|---|---|---|---|---|
| 63:11 | RESERVED | RO | RESERVED | 0x0 |
| 10 | GCLK_DROP | RW | INCOMING GLOBAL CLOCK DROPPED TOO MANY EDGES | NO RESET |
| 9 | RQ_BAD_LINVAL | RW | LINVAL DATA ERROR (BAD FORMAT, OR 0 SHARERS) | NO RESET |
| 8 | RQ_BAD_ADDR | RW | REQUEST TO UNDEFINED REGISTER ADDRESS | NO RESET |
| 7 | RP_BAD_DATA | RW | REPLY DATA ERROR | NO RESET |
| 6 | RQ_BAD_DATA | RW | REQUEST DATA ERROR | NO RESET |
| 5 | RP_LONG | RW | REPLY PACKET IS TOO LONG | NO RESET |
| 4 | RQ_LONG | RW | REQUEST PACKET IS TOO LONG | NO RESET |
| 3 | RP_SHORT | RW | REPLY PACKET IS TOO SHORT | NO RESET |
| 2 | RQ_SHORT | RW | REQUEST PACKET IS TOO SHORT | NO RESET |
| 1 | RP_BAD_CMD | RW | REPLY HEADER HAS BAD COMMAND | NO RESET |
| 0 | RQ_BAD_CMD | RW | REQUEST HEADER HAS BAD COMMAND | NO RESET |

FIG. 4

| BITS | FIELD | ACC. | COMMENT | RESET |
|---|---|---|---|---|
| 63:11 | RESERVED | RO | RESERVED | 0x0 |
| 10 | CLR_GCLK_DROP | WO | CLEAR GCLK_DROP BIT | NO RESET |
| 9 | CLR_RQ_BAD_LINVAL | WO | CLEAR RQ_BAD_LINVAL BIT | NO RESET |
| 8 | CLR_RQ_BAD_ADDR | WO | CLEAR RQ_BAD_ADDR BIT | NO RESET |
| 7 | CLR_RP_BAD_DATA | WO | CLEAR RP_BAD_DATA BIT | NO RESET |
| 6 | CLR_RQ_BAD_DATA | WO | CLEAR RQ_BAD_DATA BIT | NO RESET |
| 5 | CLR_RP_LONG | WO | CLEAR RP_LONG BIT | NO RESET |
| 4 | CLR_RQ_LONG | WO | CLEAR RQ_LONG BIT | NO RESET |
| 3 | CLR_RP_SHORT | WO | CLEAR RP_SHORT BIT | NO RESET |
| 2 | CLR_RQ_SHORT | WO | CLEAR RQ_SHORT BIT | NO RESET |
| 1 | CLR_RP_BAD_CMD | WO | CLEAR RP_BAD_CMD BIT | NO RESET |
| 0 | CLR_RQ_BAD_CMD | WO | CLEAR RQ_BAD_CMD BIT | NO RESET |

FIG. 5  60

| BITS | FIELD | ACC. | COMMENT | RESET |
|---|---|---|---|---|
| 63:45 | RESERVED | RO | RESERVED | 0x0 |
| 44 | 74—VALID | RW | SET IF AND ONLY IF CONTENTS ARE VALID | NO RESET |
| 43:41 | RESERVED | RO | RESERVED | 0x0 |
| 40 | 76—OVERRUN | RW | SET IF AND ONLY IF SUBSEQUENT ERROR HAPPENED | NO RESET |
| 39:36 | RESERVED | RO | RESERVED | 0x0 |
| 35:32 | 78—ERR_TYPE | RW | TYPE OF ERROR CAPTURED | NO RESET |
| 31 | RESERVED | RO | RESERVED | 0x0 |
| 30:20 | SOURCE | RW | SOURCE FIELD FROM FIRST ERROR'S HEADER | NO RESET |
| 19 | RESERVED | RO | RESERVED | 0x0 |
| 18:8 | SUPPL | RW | SUPPLEMENTAL FIELD FROM FIRST ERROR'S HEADER | NO RESET |
| 7 | RESERVED | RO | RESERVED | 0x0 |
| 6:0 | COMMAND | RW | CMD FIELD FROM FIRST ERROR'S HEADER | NO RESET |

FIG. 6A  70

| BITS | FIELD | ACC. | COMMENT | RESET |
|---|---|---|---|---|
| 63:38 | RESERVED | RO | RESERVED | 0x0 |
| 37:0 | ADDRESS | RW | ADDRESS FIELD FROM FIRST ERROR'S HEADER | NO RESET |

FIG. 6B  72

| BITS | FIELD | ACC. | COMMENT | RESET |
|---|---|---|---|---|
| 63:0 | DATA | RW | CONTENTS OF FIRST ERROR'S DATA FLIT (IF ANY) | NO RESET |

FIG. 7  80

METHOD AND APPARATUS FOR PROCESSING ERRORS IN A COMPUTER SYSTEM

TECHNICAL FIELD OF THE INVENTION

The present invention relates in general to computer system signal processing and more particularly to a method and apparatus for processing errors in a computer system.

BACKGROUND OF THE INVENTION

No matter how thoroughly a computer system is designed, unintended events may occur in computer systems during actual operation. Errors can happen due to a flaw in the design of the computer system or because of some operational malfunction. A well designed system should be able to anticipate various types of errors that may occur. Several problems arise when refining these general principles to specific implementations. It is difficult to classify all the errors that may possibly occur. There is no standard capability to detect an error and capture information that may assist in evaluating the error, especially when a multitude of errors are detected. There are also no efficient ways for hardware to inform software of an error and the details surrounding the circumstances of the error.

Further, the design of a computer system includes mechanisms for detecting and responding to any errors that may occur during operation. After a computer system's hardware detects the presence of an error, the computer system's software is often notified of the occurrence of the error and instructed to take appropriate action. Software development on prototype chips while in laboratory testing is hampered if some errors cannot be induced to happen and the code developed to handle these errors cannot be tested. For example, there may be no capability to generate incoming packets that have an invalid command encoding. Therefore, it is desirable to provide an efficient technique to identify and capture errors that occur during computer system operation. It is also desirable to provide a capability to induce errors into a computer system in order to test error handling software.

SUMMARY OF THE INVENTION

From the foregoing, it may be appreciated that a need has arisen for a technique to identify errors and capture information about them and provide a capability to induce the occurrence of errors in a computer system. In accordance with the present invention, a method and apparatus for processing errors in a computer system is provided that substantially eliminates or reduces disadvantages and problems associated with conventional error processing techniques.

According to an embodiment of the present invention, there is provided an apparatus for processing errors in a computer system that includes a request module that can receive incoming packets. A processor module can identify a write operation specified by an incoming request packet. The processor module determines a register specified by the incoming request packet upon which to perform the operation. A registers module maintains registers within which the write operation is performed. The incoming request packet specifies instructions for how to inject an error into the computer system. The processor module performs a write operation by writing information from the incoming request packet into one of the header and data registers of the registers module. The processor module sets an error bit to trigger processing of the injected error.

In detecting errors, the request module receives a request packet and determines whether the request packet has an error. The request module transfers the request packet to the processor module for processing in response to a determination that there is no error in the request packet. Otherwise, the request module stores header and data information associated with the request packet in the header and data registers of the registers module in response to the request module identifying an error in the request packet. The request module sets an error bit in an error register of the registers module to indicate that an error has been identified in the request packet.

The present invention provides various technical advantages over conventional error processing techniques. For example, one technical advantage is to inject errors into a computer system to test the functionality of error handling software. Another technical advantage is to efficiently identify errors and capture information concerning identified errors. Yet another technical advantages is to effectively provide error identification, capture, and injection in a common environment. Other technical advantages may be readily apparent to those of skill in the art in view of the following figures, description, and claims.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which:

FIG. 3 illustrates a block diagram of a local block unit in the node controller;

FIG. 4 illustrates an example of an error register used in a registers module of the local block unit;

FIG. 5 illustrates an example of a mask register used in the registers module of the local block unit;

FIGS. 6A and 6B illustrate an example of header registers used in the registers module of the local block unit; and FIG. 7 illustrates an example of a data register used in the registers module of the local block unit.

DETAILED DESCRIPTION OF THE INVENTION

Figure 1:
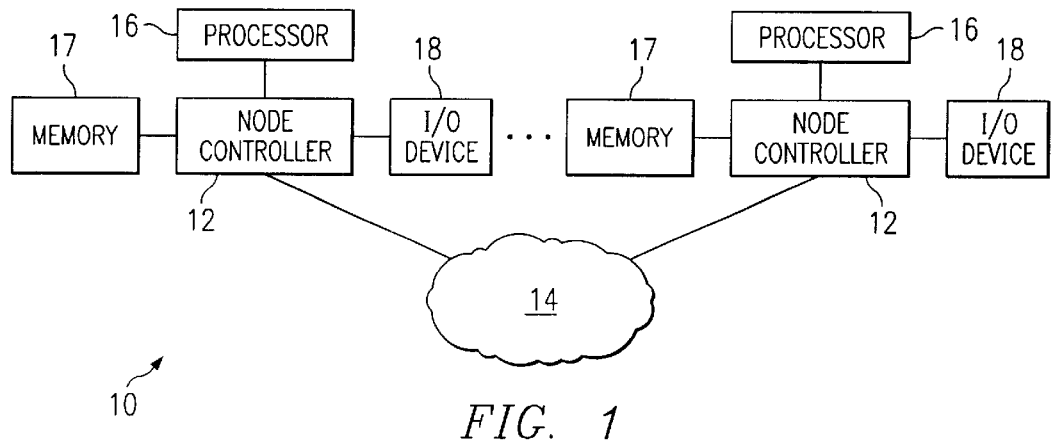
FIG. 1 illustrates a block diagram of a computer system.

FIG. 1 is a block diagram of a computer system 10. Computer system 10 includes a plurality of node controllers 12 interconnected by a network 14. Each node controller 12 processes data and traffic both internally and with other node controllers 12 within computer system 10 over network 14. Each node controller 12 may communicate with a local processor 16, a local memory device 17, and a local input/output device 18.

Figure 2:
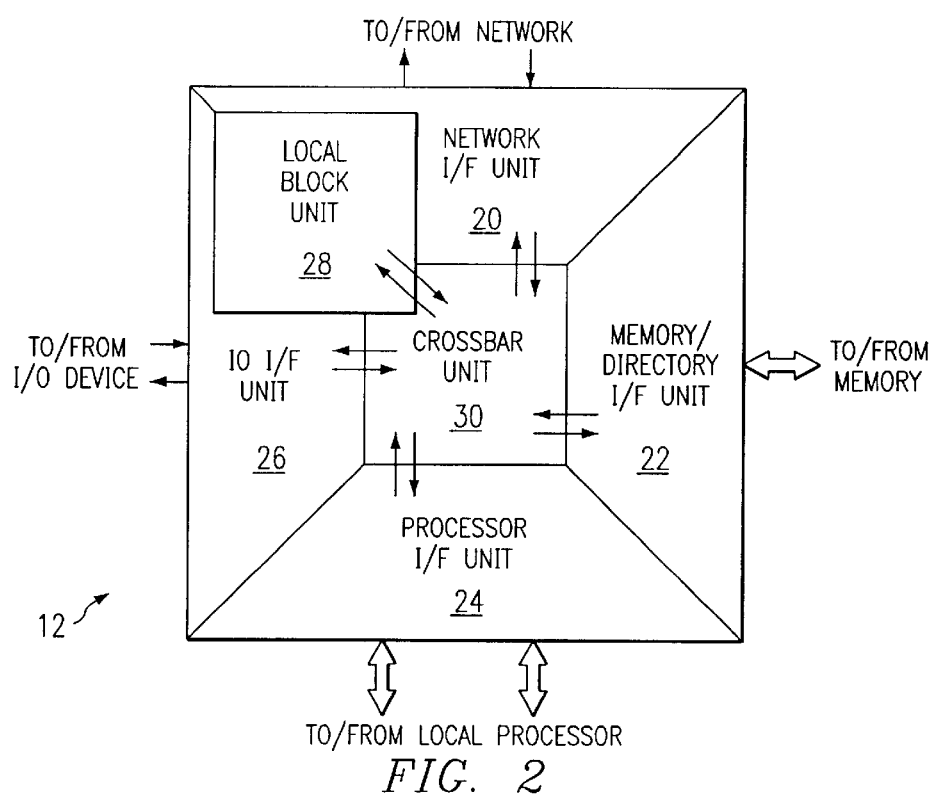
FIG. 2 illustrates a block diagram of a node controller in the computer system.

FIG. 2 is a block diagram of node controller 12 used in a multi-processor computer system 10. Node controller 12 includes a network interface unit 20, a memory directory interface unit 22, a processor interface unit 24, an input/output interface unit 26, a local block unit 28, and a crossbar unit 30. Network interface unit 20 may provide a communication link to network 14 in order to transfer data, messages, and other traffic to other node controllers 12 in computer system 10. Processor interface unit 22 may provide a communication link with one or more local processors 16. Memory directory interface unit 22 may provide a communication link with one or more local memory devices 17. Input/output interface unit 26 may provide a communication link with one or more local input/output devices 18. Local block unit 28 is dedicated to processing invalidation requests and PIO requests. Crossbar unit 30 arbitrates the transfer of data, messages, and other traffic for node controller 12.

FIG. 3 is a block diagram of local block unit 28. Local block unit 28 handles the error processing for node controller 12. Local block unit 28 includes a request module 30, an invalidation module 32, a processor module 34, an output module 36, a vector module 38, a registers module 40, a reply module 42, and a clock module 44.

Request module 30 receives incoming request packets and determines what is to be done with the received request packets. Incoming request packets may include various types of requests such as a normal programmed input/output (PIO) write request, a normal PIO read request, a vector PIO write request, a vector PIO read request, and a local invalidation request. After receiving an entire incoming request packet, request module 30 identifies the type of request packet that has been received. For request packets requiring a PIO read or write operation, request module 30 activates processor module 34 which is responsible for servicing the PIO request. For a local invalidation request, request module 30 activates invalidation module 32 which is responsible for servicing the local invalidation request. If request module 30 does not identify the request packet as a PIO or local invalidation request, the received request packet is considered to be an error. In is the case of an error, request module 30 activates registers module 40 for error notification and capture of the packet's contents.

Invalidation module 32 services local invalidation requests identified by request module 30. Upon receiving a local invalidation request, invalidation module 32 checks for a legal encoding in the local validation request. If the encoding is illegal, invalidation module 32 notifies registers module 40 of the error so that the error may be captured. If the encoding is legal, invalidation module 32 generates an invalidation request packet or an invalidation acknowledgment reply packet on behalf of every processor interface unit 24 indicated in the local invalidation request.

Processor module 34 services PIO read and write requests which may target local registers in any of the memory directory unit 22, network interface unit 20, crossbar unit 30, and local block unit 28. Processor module 34 decodes a destination address from within the PIO request to determine the particular unit in which the register specified in the request resides and ensures that the source of the request has authority to perform the operation. If the source of the request has authority to perform the operation, processor module 34 coordinates with the particular unit in which the specified register resides in order to carry out the operation. If not, then the operation is not performed. Processor module 34 is responsible for returning an appropriate reply in response to the PIO request.

Output module 36 is the passageway for outgoing request and reply packets from local block unit 28. Whenever vector module 38, processor module 34, or invalidation module 32 in local block unit 28 desires to send out a packet, either request or reply, it must transmit the packet via output module 36. Output module 36 coordinates traffic from these modules so that only one is able to transmit a request packet at a time and only one is able to transmit a reply packet at a time. Outgoing reply and request packets leave output module 36 on separate virtual channels multiplexed on a common physical channel so that flits within these outgoing request and reply packets can be interleaved.

Vector module 38 formats and transmits vector PIO read or write requests according to contents of associated registers within registers module 40. Registers module 40 maintains the state of local registers in local block unit 28. Registers module 40 provides values of various local registers to other modules within local block unit 28. Registers module 40 updates local registers in response to PIO write requests or other activity within local block unit 28 such as error capture and injection. Registers module 40 also includes control parameters to assist clock module 44 to drive real time clock output signals from local block unit 28.

Reply module 42 handles incoming vector reply packets. After receiving a vector reply packet, reply module 42 notifies registers module 40 so that the information within the vector reply packet can be retained in associated local registers. If reply module 44 receives a reply packet that is not encoded as a vector reply packet, reply module 44 informs registers module 40 that an error has occurred so that registers module 40 can capture the error.

For error processing, registers module 40 includes several registers to identify and handle an error. FIG. 4 shows an example of an error register 50 in registers module 40. Error register 50 provides a one bit field for, in this example, eleven types of errors. Ten of these may occur as a result of an incorrect request or reply packet received by local block unit 28. The other error does not involve receipt of a packet but occurs as a result of an unexpected behavior of the incoming real time clock signal received at clock module 44. Whenever local block unit 28 detects an error of a specified type, registers module 40 sets the corresponding bit in error register 50. System software can read the value of error register 50 through a normal PIO read operation and obtain information about what particular types of errors have occurred. Upon setting a bit in error register 50, registers module 40 generates an interrupt signal 52 to drive an input to processor interface unit 24. Interrupt signal 52 indicates that an error has occurred and prompts system software to take appropriate action. Processor interface unit 24 selects a processor 16 to handle the error and causes the selected processor to interrupt its operation in order to invoke error handling software.

Although the processor interrupt could have been triggered by transmitting a PIO write request packet to processor interface unit 24 which targets a local register in processing unit 24, several advantages are achieved by directly generating a dedicated interrupt signal 52 from registers module 40. Complications such as preparing and sending PIO write requests and receiving subsequent replies through the request and reply scheme of local block unit 28 are avoided. The identified error may make it impossible for a PIO write request to be conveyed to processor interface unit 24. By providing a direct dedicated interrupt signal from registers module 40 to processor interface unit 24, a simpler and more reliable technique is employed to initiate an interrupt for error handling.

FIG. 5 shows an example of a mask register 60. Mask register 60 allows software to clear out some error bits in error register 50 without affecting other error bits within error register 50. Mask register 60 includes one bit fields corresponding to each of the error types of error register 50. System software, through normal PIO write operations, may set a field in mask register 60, causing registers module 40 to clear the corresponding field in error register 50. If a bit is not set in mask register 60, then registers module 40 leaves the corresponding field in error register 50 unchanged. Once an error has been handled by a selected processor 16, software can individually clear the associated bit in error register 50 without affecting any of its other bits through mask register 60. If system software is handling one type of error and another error of a different type occurs, the error bit associated with the second error remains set in error register 50 even after system software clears the error bit of the previous error. The use of mask register 60 ensures that errors are not ignored when other errors are being analyzed.

FIGS. 6A and 6B show examples of header registers 70 and 72 in registers module 40. FIG. 7 shows an example of a data register 80 in registers module 40. Upon receiving an initial error, registers module 40 saves the contents of the offending packet's header in header registers 70 and 72 and the contents of the offending packet's data (if any) in data register 80. A valid bit 74 in header register 70 is set and an overrun bit 76 is cleared. A value is assigned to the type of error that occurred and is stored in an error type field 78. The bit associated with the identified error type is set in error register 50. Valid bit 74 indicates that header registers 70 and 72 and data register 80 contain information with respect to a packet that has caused an error. If a subsequent error occurs while valid bit 74 is set, overrun bit 76 is set, the appropriate bit in error register 50 is set, but the contents of the packet causing the subsequent error are discarded and not kept. Overrun bit 76 identifies that subsequent errors were received but associated packet contents were not captured. Though shown to capture and store header and data information from only a single error packet as a design choice, the system may be designed to capture and store header and data information for multiple error packets.

All registers related to error processing remain intact despite an occurrence of a reset operation across node controller 12. This ensures that error states are not lost due to a system reset. Some errors may cause portions of node controller 12 to become inoperative so that error handling cannot proceed without a system reset. In this instance, system software will still have the opportunity to analyze the cause of the problem after a system reset has occurred.

Though local block unit 28 identifies and handles errors due to receipt of reply and request packets, local block unit 28 may also be used to inject errors for handling by system software. In order to inject an error into local block unit 28, one or more PIO write operations may be initiated by a processor 16. These PIO write operations are used to write desired test header and data information into header registers 70 and 72 and data register 80. In order to trigger execution of the error handling capability of the system, either the same or another PIO write operation is generated to set a desired error bit in error register 50. Setting of the error bit triggers activation of interrupt signal 52. The appropriate processor has its operations interrupted to handle the error by analyzing the header and data information injected into the header registers 70 and 72 and the data register 80. In this manner, any of the errors specified in error register 50 may be induced in a known circumstance in order to test the system's error handling software without forcing errors during normal operation which may be difficult to induce.

To inject an error, the software preferably performs one or more PIO write operations on registers in registers module 40. Each PIO write operation preferably modifies the state of only a single register as each PIO write operation preferably specifies exactly one unique address. Since error injection may require setting up several different registers (e.g., header registers 70 and 72 for header information and data register 80 for data information), several separate PIO write requests may be issued by the software.

Thus, it is apparent that there has been provided, in accordance with the present invention, a method and apparatus for processing errors in a computer system that satisfies the advantages set forth above. Although the present invention has been described in detail, it should be understood that various changes, substitutions, and alterations may be made herein. For example, though certain errors have been identified in the various registers, additional errors may also be processed by in the computer system as desired by the designer. Other examples may be readily ascertainable by those skilled in the art and may be made herein without departing from the spirit and scope of the present invention as defined by the following claims.

What is claimed is:

1. A method of processing errors in a computer system, comprising:

receiving a packet of data;

identifying at least one of a plurality of types of errors in the packet of data;

setting an error bit in an error register corresponding to the type of error identified in the packet, the error register including more than one indication that a particular type of error has been received;

storing header information associated with the packet;

storing data information associated with the packet;

asserting an interrupt signal in response to the error bit.

2. The method of claim 1, further comprising:

checking for a presence of a valid bit, the valid bit indicating that a previous type of error has been identified and not yet processed.

3. The method of claim 2, further comprising:

discarding the packet of data in response to the presence of the valid bit.

4. The method of claim 1, further comprising:

selecting one of a plurality of processors to process the identified type of error.

5. The method of claim 4, further comprising:

interrupting operation of the selected one of the plurality of processors in response to the interrupt signal.

6. The method of claim 5, further comprising:

providing the header information and the data information to the selected one of the plurality of processors in order to process the identified type of error.

7. The method of claim 1, wherein the packet is a PIO write request packet in order to inject a type of error into the computer system for processing.

8. The method of claim 7, wherein the data information of the PIO write request packet is stored in a register for capturing errors.

9. The method of claim 8, further comprising:

triggering processing of the identified type of error in response to setting the error bit.

10. An apparatus for processing errors in a computer system, comprising:

a request module operable to receive an incoming request packet;

a processor module operable to identify a write operation specified by the incoming request packet, the processor module operable to determine a register specified by the incoming request packet upon which to perform the operation;

a registers module operable to maintain registers within which the write operation is performed, wherein the incoming request packet includes instructions to inject an error into the computer system, the processor module operable to perform a write operation by writing data from the incoming request packet into a specified error header or error data register of the registers module, the processor module operable to set an error bit to trigger processing of the injected error; and wherein the request module is operable to receive a reply packet, the request module operable to determine whether the reply packet has an error, the request module operable to transfer the reply packet to the processor module for processing in response to a determination that there is no error in the reply packet, the request module operable to store header and data information associated with the reply packet in the header and data registers of the registers module in response to the request module identifying an error in the reply packet.

11. The apparatus of claim 10, wherein the request module sets an error bit in an error register of the registers module to indicate that an error has been identified in the reply packet.

12. The apparatus of claim 11, wherein the registers module activates an interrupt signal in response to an error bit being set in the error register.

13. The apparatus of claim 10, wherein the request module determines whether a valid bit has been set in the registers module, the valid bit indicating that a previous reply or incoming request packet was received with an error that has yet to be processed, the request module operable to set an error bit in an error register of the registers module and discard the reply packet in response to the valid bit being set.

14. The apparatus of claim 13, wherein the registers module is operable to set an overrun bit, indicating that the contents of the reply packet were discarded.

* * * * *